(12) United States Patent
Arvidsson et al.

(10) Patent No.: US 8,897,819 B2
(45) Date of Patent: Nov. 25, 2014

(54) METHOD, AN APPARATUS AND A NETWORK NODE FOR SELECTIVE PAGING OF USER EQUIPMENTS IN CELLULAR MOBILE NETWORKS

(75) Inventors: Åke Arvidsson, Solna (SE); Attila Mihály, Dunakeszi (HU); Johan Rune, Lidingo (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 224 days.

(21) Appl. No.: 13/474,763

(22) Filed: May 18, 2012

(65) Prior Publication Data
US 2012/0295643 A1 Nov. 22, 2012

(30) Foreign Application Priority Data
May 20, 2011 (EP) .................................... 11166975

(51) Int. Cl.
*H04W 68/00* (2009.01)
*H04W 68/04* (2009.01)

(52) U.S. Cl.
CPC ..................................... *H04W 68/04* (2013.01)
USPC ..................... 455/458; 455/422.1; 455/432.1; 455/435.1; 455/456.1; 455/456.2; 455/456.5; 455/456.6; 455/515

(58) Field of Classification Search
USPC .......... 455/432.1, 435.1, 456.1, 456.2, 456.5, 455/456.6, 458, 422.1, 515
See application file for complete search history.

(56) References Cited

U.S. PATENT DOCUMENTS

| | | | |
|---|---|---|---|
| 5,390,234 A * | 2/1995 | Bar-Noy et al. | 455/456.1 |
| 5,590,398 A * | 12/1996 | Matthews | 455/433 |
| 5,875,400 A * | 2/1999 | Madhavapeddy et al. | 455/458 |
| 6,058,308 A * | 5/2000 | Kallin et al. | 455/432.3 |
| 6,181,945 B1 * | 1/2001 | Lee | 455/445 |
| 7,623,876 B2 * | 11/2009 | Sarikaya et al. | 455/458 |
| 7,787,889 B1 * | 8/2010 | Patini | 455/456.1 |

* cited by examiner

*Primary Examiner* — Olumide T Ajibade Akonai
(74) *Attorney, Agent, or Firm* — Rothwell, Figg, Ernst & Manbeck, P.C.

(57) ABSTRACT

The present invention relates to the field of selective paging in cellular mobile networks, in particular to a method, an apparatus, and a network node for use in selectively paging a user equipment (UE) in a plurality of cells in which the UE is estimated to be located. Accordingly, a method in a network node in a wireless communication network for use in paging a UE in a plurality of cells is provided. The method comprises: determining, for the plurality of cells, the number of observations that is made of the UE in each of a number of sets of cells among said plurality of cells; determining a paging sequence for the UE in the plurality of cells based on said determined number of observations in each of said sets of cells; and enabling paging of the UE in the plurality of cells according to the determined paging sequence.

17 Claims, 7 Drawing Sheets

| Hours | Days | TA 23 | TA 16 | TA 15 | TA 8 | TA 2 |
|---|---|---|---|---|---|---|
| 8:00 - 12:00 | M-F | 5 | 1 | 2 | 1 | 80 |
| 12:00 - 16:00 | M-F | 1 | 2 | 1 | 4 | 76 |
| 16:00 - 08:00 | M-F | 64 | 3 | 2 | 4 | 5 |

Fig. 3

| Hours | Days | TA 23 | TA 16 | TA 15 | TA 8 | TA 2 |
|---|---|---|---|---|---|---|
| 8:00 - 12:00 | M-F | S | S | S | S | P |
| 12:00 - 16:00 | M-F | S | S | S | S | P |
| 16:00 - 08:00 | M-F | P | S | S | S | S |

| Hours | Days | TA 23 | TA 16 | TA 15 | TA 8 | TA 2 |
|---|---|---|---|---|---|---|
| 8:00 - 12:00 | M-F | P | S | S | S | P |
| 12:00 - 16:00 | M-F | P | S | S | S | P |
| 16:00 - 08:00 | M-F | P | S | S | S | P |

Fig. 4

| Time period | 0-2 min | 2-5 min | 5-15 min | 15-30 min | 30-60 min |
|---|---|---|---|---|---|
| Counter | 95760 | 36033 | 10962 | 2799 | 481 |
| Total | 97694 | 37880 | 12736 | 4390 | 1597 |

Fig. 5

| Time period | 0-2 min | | | 2-5 min | | | 5-15 min | | |
|---|---|---|---|---|---|---|---|---|---|
| | UE still in TA? | UE in TA N1? | UE in TA N2? | UE still in TA? | UE in TA N1? | UE in TA N2? | UE still in TA? | UE in TA N1? | UE in TA N2? |
| Counter | 95760 | 435 | 665 | 36033 | 250 | 387 | 10962 | 201 | 309 |
| Total | 97694 | | | 37880 | | | 12736 | | |
| Time period | 15-30 min | | | 30-60 min | | | | | |
| | UE still in TA? | UE in TA N1? | UE in TA N2? | UE still in TA? | UE in TA N1? | UE in TA N2? | | | |
| Counter | 2799 | 170 | 275 | 481 | 100 | 215 | | | |
| Total | 4390 | | | 1597 | | | | | |

Fig. 6

METHOD, AN APPARATUS AND A NETWORK NODE FOR SELECTIVE PAGING OF USER EQUIPMENTS IN CELLULAR MOBILE NETWORKS

CROSS-REFERENCE TO RELATED APPLICATION(S)

The present application claims priority benefit under 35 U.S.C. §119(a) to EP Application No. 11166975.0, filed May 20, 2011, the disclosure of which is incorporated by reference herein in its entirety.

TECHNICAL FIELD

The present invention relates to the field of selective paging in cellular mobile networks, in particular to a method, an apparatus, and a network node for use in selectively paging a user equipment in a plurality of cells in which the user equipment is estimated to be located.

BACKGROUND

Geographical areas served by Public Land Mobile Networks (PLMNs) are typically partitioned into mobility areas (MAs) which may be referred to as, for example, location areas (LAs), routing areas (RAs) or tracking areas (TAs). A set of mobility areas managed by one or more network nodes is known as the service area (SA) for these nodes. The purpose of these areas is to keep an approximate track of the whereabouts of user equipments (UEs) in the PLMNs.

The design of these areas reflects a trade off between the need for position updating (i.e. UEs updating the network about changes in their MA) and user paging (i.e. networks locating UEs when there is incoming traffic to a UE). The larger the area, the less resources have to be spent on position updating in the network (i.e. reduced need for MA updates) since large areas means that it is less likely that users leave the area to which they are associated. However, more resources instead have to be spent on user paging in the network (i.e. increased need for pages) since large areas also means that users typically must be paged in more cells.

The second and third generations of mobile systems (2G and 3G, also referred to as GSM and WCDMA respectively) use a "double" partitioning, that is, LAs for circuit switched services and RAs for packet switched services. Mobile Switching Centres/Visited Location Registers (MSC/VLRs) which manage circuit switched traffic, keep track of the LAs of all UEs in their respective SAs while Serving GPRS Service Nodes (SGSNs), which manage packet switched traffic, keep track of the RAs of all UEs in their respective SAs. A problem with this solution is that it is inflexible in the sense that all users, irrespective of how mobile they are, must be handled in the same way. This means, for example, that those users who do not move at all are often paged in large areas in spite of their immobility and/or that those users who move quickly must update their LAs and RAs continuously and frequently.

The fourth generation of mobile systems (4G, also referred to as LTE), which only handles packet switched traffic, uses single partitioning into TAs and Mobility Management Entities (MMEs) keep track of the TAs of all UEs in their respective SAs. TAs are identified by numbers (TAIs) and collections of TAIs are known as TAI lists. TAI lists increase the flexibility compared to 2G and 3G in that UEs can be assigned TAI lists, and thus be registered in multiple TAs. It is noted that, although the use of TAI lists in 4G mobile systems introduces a degree of flexibility compared to the rigid LAs and RAs in 2G and 3G mobile systems, this does not solve the problem of optimising the trade-off between position updating and user paging. The problem of position updating is more or less the same as in 2G and 3G mobile systems wherein typically solutions include management concerns with respect to administrative boundaries, load concerns with respect to MSCs and SGSNs, and combinations of experience and intuition. However, this problem is not referred to in any more detail herein. Instead, focus is on the problem of performing the user paging.

WO/2008/112161 and WO/2008/146868 describe the use of TAI lists. The common denominators are that they both suggest that (i) different TAI lists be applied for different degrees of mobility such as no movement, slow movement and fast movement and that (ii) UEs are supposed to explicitly detect and report such states to MMEs or similar entities. These solutions, however, require modifications in the UEs which are very difficult to implement given the large numbers of users and UEs involved. Furthermore, TAI lists for users with fast movements may include large numbers of TAs in which user paging still may be inefficient, or that "artificial" limits may have to be imposed on these TAI lists in order to perform efficient user paging.

WO/2008/031269 describes a solution which seems to be directed towards reducing the number of paging attempts. WO/2008/031269 apply mainly to 2G and 3G mobile systems and attempt to reduce the number of cells in which a user is paged by not paging in the entire LA/RA but in the cell where the user was most recently seen and possibly also in a set of neighbouring cells as extracted from databases.

WO/2008/031269 seems to describe automatic insertion and removal of suitable cells from such paging sets of cells based on observed paging success rates, and also deals with further aspects as to which cells to include in this list of cells. The solution is limited in that users assigned long TAI lists will be observed less frequently, hence the last observation of the user may be older and thus less relevant. In other words, these solutions make it difficult to take full advantage of TAI lists and, in particular, to combine position reporting efficiency with performing efficient user paging.

In the Master Thesis, "Dynamic Location Management and Activity-based Mobility Modelling for Cellular Networks" (John Scourias, Master Thesis, University of Waterloo, (1997)), a solution is proposed in which UEs collect statistics on cell changes (per cell pair) and cell camping times (per cell) and that the results be used to select a paging area of cells and a cell paging order. The paging area of cells is created by adding the current cell to an empty list and repeatedly including the most likely next cells for all cells in the list based on the cell change statistics. The list is formed by the UE and then reported to the network. The paging order of cells is created by paging in the cells with the longest average camping times first and paging in the cells with the shortest average camping times last. However, this solution requires that the UEs collect statistics, compute paging areas of cells and report the results to the network. Notwithstanding the required modifications to the UEs to perform these tasks, it will also increase UE power consumption. Moreover, it will create more control signalling to take place in the network, which will increase the load on network elements and signalling channels.

Additionally, this solution also does not take current information or regular movement patterns of UEs into account. In general, this solution provides a conflict between saving location updates and saving paging attempts. Few location updates are obtained from comprehensive lists but such lists may cause more paging attempts as average camping times become less relevant as location predictors over longer time scales.

SUMMARY

It is an object to obviate at least some of the above disadvantages and provide a method that enables an improved and more efficient paging of a UE.

Accordingly, a method in a network node in a wireless communication network for use in paging a UE in a plurality of cells is provided. The method comprises: determining, for the plurality of cells, the number of observations that is made of the UE in each of a number of sets of cells among said plurality of cells; determining a paging sequence for the UE in the plurality of cells based on said determined number of observations in each of said sets of cells; and enabling paging of the UE in the plurality of cells according to the determined paging sequence.

One advantage achieved this method is that by determining observation statistics on a per UE basis, it enables a stepwise paging sequence in which sets of cells that has a higher degree of likelihood than other sets of cells in resulting in a page response from the UE are paged first; the degree of likelihood to result in a page response being based on previously observed observations of the UE in said sets of cells. Thus, for example, the method is able to allow the assignment of long TAI lists comprising a large number of TAIs representing a large number of TAs (i.e. sets of cells), which reduces the number TA updates, while at the same time avoids performing a large number of pages by paging according to a more efficient paging sequence. This advantagesouly provides an improved and more efficient paging of a UE.

Determining the number of observations that is made of the UE in each of the sets of cells and determining the paging sequence for the UE may be performed for each of a predetermined number of time periods. Consequently, paging may be enabled of the UE which further comprises: selecting one of the determined paging sequences for the UE based on a current time period, and enabling the paging according to the selected determined paging sequence. This advantageously enables division into separately treated time periods which may make use of inherent user behaviour and regular movement patterns of the users at these different time periods in order to achieve a more effective paging sequence in future corresponding time periods.

Determining a paging sequence for the UE may further comprise: for each set of cells in which an observation has been made, calculating a probability value for the UE based on at least the number of observations in the set of cells and the total number of observations in the plurality of cells; and determining one or more primary sets of cells in which the UE is to be paged in first in the paging sequence based on the calculated probability values. This advantageously provides probability values for each of the UEs which are indicative of how each set of cells relate to the rest of the sets of cells in the sets of cells among the plurality of cells in terms of degree of likelihood to receive a page response from the UE when paging in said set of cells. Furthermore, it also allows the determination of one or more sets of cells, referred to as primary sets of cells, in which paging is to be performed first in the paging sequence. One example of how this may be performed is the use of a predetermined threshold probability value for which the probability value of the set of cells has to above in order for the set of cells to be comprised in the primary set of cells in which paging is to be performed first.

Determining a paging sequence of cells/tracking areas for the UE may further comprise: determining one or more secondary sets of cells or later sets of cells in which the UE is to be paged in secondly or later on in the paging sequence in case no page response is received earlier in the paging sequence based on the calculated probability values. This advantageously allows the determination of one or more secondary sets of cells or even one or more later sets of cells, referred to as secondary sets of cells or later sets of cells, among the sets of cells among the plurality of cells in which paging is to be performed subsequently if no response has been received after the first round of paging has been performed for the primary sets of cells in the paging sequence.

Also, determining a paging sequence for the UE may further comprise: determining if a set of cells in which the last observation of the UE was made, and/or thereto neighbouring set(s) of cells, are to be comprised in the one or more primary, secondary or later sets of cells in which the UE is to be paged in according to the paging sequence based on a probability value indicating the probability that the UE may be found in the set of cells and/or thereto neighbouring set(s) of cells. This advantageously further provides a more effective paging sequence by enabling the use of a probability value when determining the paging sequence for a UE, wherein such a probability value may be made to reflect the common general behaviour of users located in that particular set of cells. This may also comprise comparing this probability value with the probability value for the one or more primary, secondary or later sets of cells in which the UE is to be paged in according to the paging sequence; and determining if the set of cells in which the last observation of the UE was made, and/or thereto neighbouring set(s) of cells, are to be comprised in the one or more primary, secondary or later sets of cells in which the UE is to be paged in according to the paging sequence based on said comparison. This may advantageously ensure that the latest set of cells and/or neighbouring set(s) of cells, e.g. in dependence of the common general behaviour of users located in that particular set of cells, may be incorporated into the one or more set of cells that are comprised in the primary, secondary or later sets of cells in case this is deemed beneficial.

The probability value may be determined by, for a predetermined number of time periods, determining the number of UEs observed for each time period in the set of cells by monitoring elapsed time periods of successive observations of multiple UEs in the same set of cells; and calculating the probability value for the UE indicating the probability that the UE may be found in a set of cells based on the time, the set of cells in which the last observation of the UE was made, and the determined number of UEs observed for each time period in the set of cells. For example, prior to the paging of a UE, this may advantageously allow for checking the time and the set of cells of the last observation of the UE, compute the elapsed time of the UE within the set of cells of the last observation, and estimate a probability value that the UE may be found in that set of cells based the dwelling probability value for the elapsed time period and set of cells. This probability value may then be compared with the probability value for the primary, secondary or later sets of cells and perhaps be incorporated therein as previously described to achieve an optimal selection/combination of the most likely set of cells in the paging sequence.

It should be noted that the steps that are performed for each set of cells as described above may also be performed per IMSI, per IMEI, per equipment type, per time of day, per day of week, per user subscription type and/or per page request type (e.g. voice and data may be treated differently).

Determining the number of observations per cell/tracking area that is made of a UE in each of the sets of cells may further comprise: initiating signalling transmissions with the UE, such as a GUTI relocation signalling, in order to receive and determine an observation of the UE based on the expiry of a predetermined time period since the last observation of the UE. This advantageously enables an active retrieval of observation data by the wireless communication network. This signalling transmission may preferably be low priority signalling transmission in the wireless communication network, so as to not affect the UE or wireless communication network in any significant way.

Determining the number of observations per cell/tracking area that is made of a UE in each of the sets of cells may further comprise: merging two time periods of the predetermined number of time periods based on a calculated correlation coefficient between the two time periods over one or more sets of cells; or splitting a time period of the predetermined number of time periods based on a calculated dispersion coefficient of the time period over one or more sets of cells. This advantageously provides for an automatic self-tuning of the time-periods.

Enabling the paging of the UE may further comprise, in case no paging response is received from the UE for the paging sequence, enabling a repeat of the paging according to the paging sequence one or more times, and/or enabling paging in all cells/tracking areas in which a observation has been made of the UE, and/or enabling paging in all sets of cells in which a page response has been made by the UE, and/or enabling paging in all sets of cells among the plurality of cells, before rejecting a paging request. This provides for a repeatable paging sequence contributing to a more efficient paging sequence.

It should be noted that each set of cells may form a tracking area associated with a tracking area identity, said tracking area identities of the tracking areas may be comprised in a tracking area identity list associated with the UE. In this case, determining a paging sequence for the UE may further comprise: in case no observation has been made of the UE for a tracking area with a tracking area identity comprised in a tracking area identity list associated with the UE, including the tracking area in either of the primary, secondary or later set of cells in which the UE is to be paged in according to the paging sequence.

Furthermore, the predetermined number of time periods may be separate time periods of a twenty-four hour time cycle and/or separate time periods of a week. According to an example, a large number of users has been shown to tend to visit about 5-50 cells in regular patterns over a 24 hour time period for one or more days of the week. By incorporating this information into the predetermined number of time periods, a more effective paging sequence may be achieved.

An apparatus for use in a network node in a wireless communication network for paging a UE in a plurality of cells is provided. The apparatus may comprise: a paging sequence determination unit configured to determine, for the plurality of cells, the number of observations that is made of the UE in each of a number of sets of cells among said plurality of cells, determine a paging sequence for the UE in the plurality of cells based on said determined number of observations in each of said sets of cells, and enable paging of the UE in the plurality of cells according to the determined paging sequence.

In addition, a network node for use in a wireless communication network comprising an apparatus as described above is also provided. The network node may be an MME or HS in a 3GPP Evolved Packet System network.

BRIEF DESCRIPTION OF THE DRAWINGS

The above and other features and advantages of the present invention will become readily apparent to those skilled in the art by the following detailed description of exemplary embodiments thereof with reference to the accompanying drawings, wherein:

FIG. 3 illustrates a table of exemplary observation data collected for the UE in FIG. 2 according to an embodiment of the invention, FIG. 4 illustrates tables of exemplary paging sequence schemes for the UE in FIG. 2, for which the exemplary observation data in the table of FIG. 3 has been collected, according to an embodiment of the invention, FIG. 5 illustrates a table of exemplary observation data collected for all UEs for a tracking area (TA) according to an embodiment of the invention, FIG. 6 illustrates a table of exemplary observation data collected for all UEs for one or more tracking areas (TAs) according to an embodiment of the invention.

ABBREVIATIONS

Figure 1:
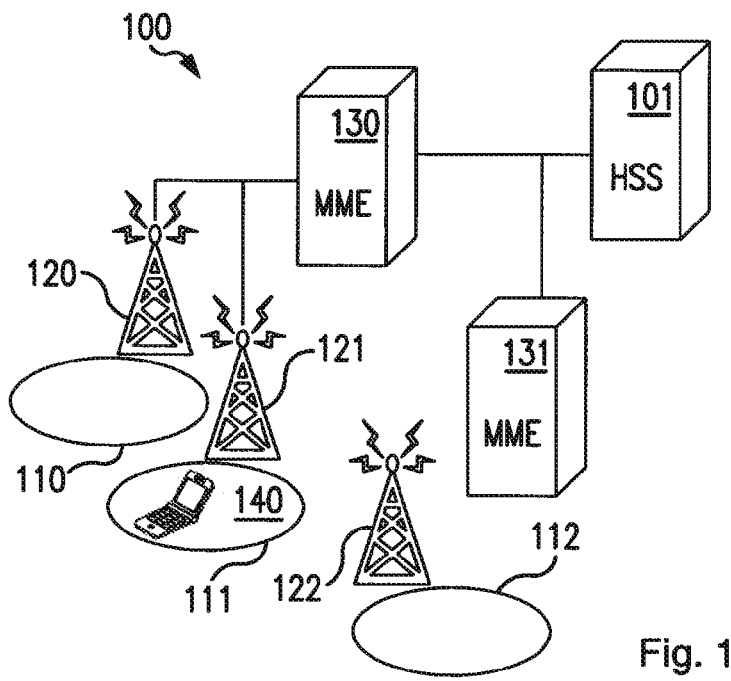
FIG. 1 illustrates a 3GPP Long Term Evolution (LTE) wireless communication system having a network node comprising an apparatus according to an embodiment of the invention.

3GPP $3^{rd}$ Generation Partnership Project
APN Access Point Name
ECM EPS Connection Management
EMM EPS Mobility Management
EPS Evolved Packet System
GPRS General Packet Radio Service
GSM Global System for Mobile Communications
GUTI Globally Unique Temporary Identity
HSS Home Subscriber Server
IE Information Element
IMEI International Mobile Equipment Identity
IMSI International Mobile Subscriber Identity
LA Location Area
LAI Location Area Identity
LTE Long Term Evolution
MA Mobility Area
MME Mobility Management Entity
MSC Mobile Switching Centre
PLMN Public Land Mobile Network
RA Routing Area
RAI Routing Area Identity
SA Service Area
SDL Specification and Description Language
SGSN Serving GPRS Service Node
SIM Subscriber Identity Module
TA Tracking Area TAI Tracking Area Identity
TAU Tracking Area Update
UE/WTRU UE or Wireless Transmit/Receive Unit
UICC Universal Integrated Circuit Card
WCDMA Wideband Code Division Multiple Access

DESCRIPTION

The figures are schematic and simplified for clarity, and they merely show details which are essential to the understanding of the invention, while other details have been left out. Throughout, the same reference numerals are used for identical or corresponding parts or steps. It may also be noted that the expression "user equipment" (UE) or "wireless transmit/receive unit" (WTRU) includes, but is not limited to, a mobile terminal, a mobile phone, a personal digital assistant, a palm top, a gaming equipment, a portable media player, a mobile station, a portable computer equipped with suitable transceivers, a stationary computer equipped with suitable transceivers and the like.

It should be noted, however, that 3GPP networks primarily keep track of subscriptions (identified by IMSIs) rather than physical devices (identified by IMEIs), and that physical units conventionally become associated with subscriptions through the use of UICC/SIM cards. Thus, these associations may change as UICC/SIM cards are moved between different physical units. For illustrative purposes, the term "user equipment" or "UE" will be the term most commonly used herein, but may also be read as "user" and technically corresponds to IMSI, the combination of IMSI and IMEI and/or only IMEI.

In FIG. 1, an example of a wireless communication system comprising a plurality of access nodes 120, 121, 122 is illustrated. The wireless communication system is shown as a 3GPP Long Term Evolution (LTE) wireless communication system 100, but may be any wireless communication system in which it is suitable to use paging of UEs in a plurality of cells 110, 111, 112. The LTE wireless communication network 100 may comprise a Home Subscriber Server (HSS) 101, a Mobility Management Entity (MME) 130, 131, access nodes 120, 121, 122 and UEs 140. The access node 120, 121, 122, such as a radio base station network node or eNode B in the LTE wireless communication system 100, is served by the MME 130, 131. Each access node 120, 121, 122 is associated with at least one cell 110, 111, 112. The access nodes 120, 121, 122 may be connected and configured to communicate with each other over, for example, an X2 connection. The access nodes 120, 121, 122 comprise one or more antennas for wireless radio communication with UEs 140 located within their covering range, i.e. the at least one cell 110, 111, 112, respectively.

In a simplified example, a UE 140 in an LTE wireless communication system may be described as a state machine with the mobility states, EMM-DEREGISTERED and EMM-REGISTERED, and the connection states, ECM-IDLE and ECM-CONNECTED. In this simplified view, a UE 140 becomes EMM-REGISTERED as it is switched on. The UE 140 may then establish one or more APN, whereby the UE 140 becomes EMM-REGISTERED and ECM-IDLE. Upon actually transmitting or receiving data, the UE 140 becomes EMM-REGISTERED and ECM-CONNECTED.

The scope of a TAI list for a UE 140 in a LTE wireless communication system 100 is limited to the TAIs of a specific MME SA. Inside this SA, the whereabouts of the UE 140 when in the ECM-IDLE state may be tracked to the level specified by the TAI lists while the whereabouts of the UE 140 when in the ECM-CONNECTED state may be tracked to the cell level 110, 111, 112. To this end, all cells repeatedly broadcast the TAI of the TA to which they are associated, and UEs continuously tune in to the cell with the currently strongest signal. A UE 140 may perform a tracking area update (TAU), that is, report its location to the MME 130, 131, if (i) the UE 140 cannot find the broadcast TAI in its TAI list or (ii) the periodic inactivity timer for the UE 140 expires.

The HSS 101, the MME 130, 131 and the access nodes 120, 121, 122 may in the following be referred to as network nodes 101, 130, 131. Hence, the expression "network node" is to be understood as primarily meaning any one of the HSS 10, the MME 130, 131 and the access nodes 120, 121, 122. However, the expression "network node" may also extend to cover other network entity nodes, such as, Operation and Management nodes (O&M), Operation and Support System nodes (OSS), or shared database nodes (may be used for synchronisation of common data in MME pools).

It should be noted that although the following examples described in reference to FIG. 3-4 refers to tracking areas (TAs), the tracking areas (TAs) are only one example of a set of cells. In a similar manner, the same principle as described for the TAs below may also be applied to any predetermined set(s) of cells or combination of cells. Thus, the term "set of cells" is to be understood as any predetermined group of cells comprising at least one cell.

Figure 2:
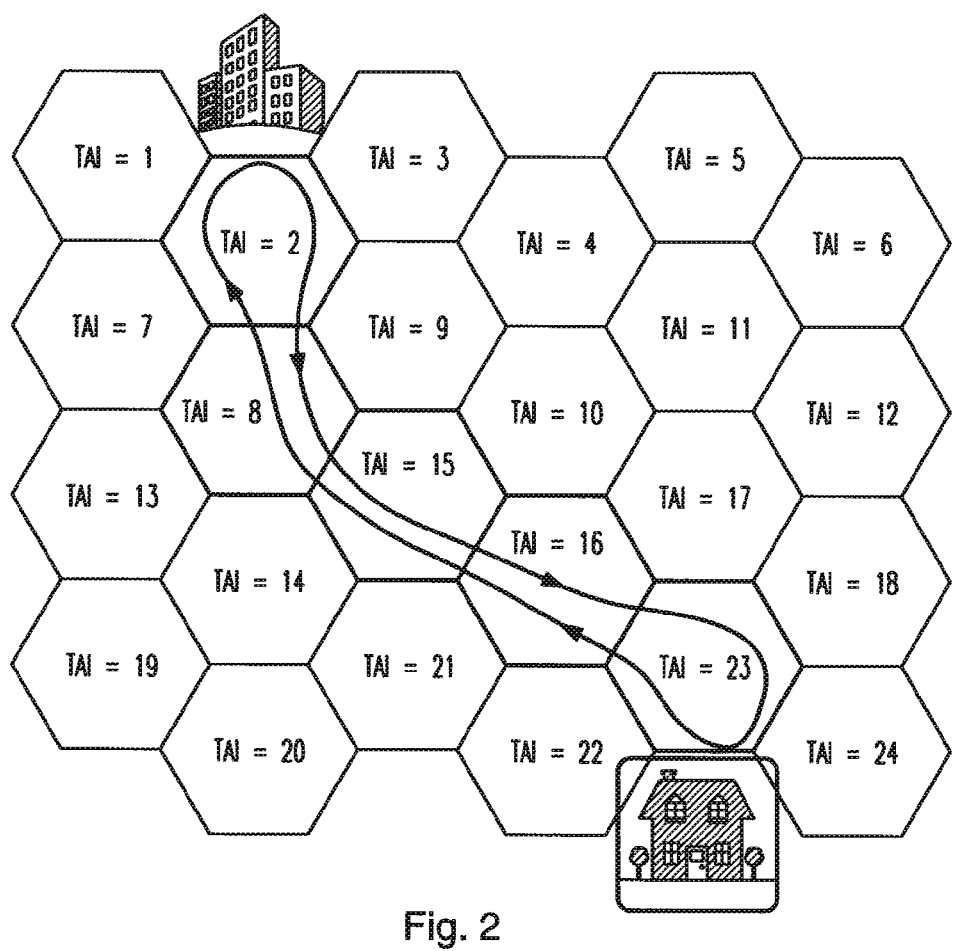
FIG. 2 illustrates an example of a regular movement pattern of a UE in a wireless communication system.

FIG. 2 illustrates an example of a regular movement pattern of a user 140 in the LTE wireless communication system 100. The LTE wireless communication system 100, which only handles packet switched traffic, uses single partitioning of all cells 110, 111, 112 into TAs 1-24. The MMEs 130, 131 keep track of the TAs 1-24 of all users in their respective SAs. TAs 1-24 are identified by numbers (TAI=1, 2, . . . , 23, 24) and collections of TAIs are known as TAI lists. A user 140 may be assigned a TAI list, and thus be registered in multiple TAs 1-24.

In "Understanding individual human mobility patterns", González, M. G., Hidalgo, C. A. and Barabási A. L. Nature, 453, 779-782 (2008), measurement studies indicate that users of UEs tend to visit 5-50 GSM cells in relative regular patterns over a 24 hour time period, and that these cells tend to form one or more clusters when plotted on maps. This correspondingly supports the illustrated regular movement pattern in FIG. 2 of a user 140 in a LTE wireless communication system 100 during an average weekday between a home location 210 and a work location 211.

As can be seen in FIG. 2, a suitable TAI list for the user 140 may thus comprise the TAIs (23, 16, 15, 8, 2). However, it may also be realised that during office hours the most likely location of the user 140 is TA 2 (i.e. TAI=2), and TA 23 (TAI=23) outside office hours. This is further illustrated by the exemplary observation data collected for the user 140, according to an embodiment of the invention, shown in the table of FIG. 3.

FIG. 3 shows a table of exemplary observation data collected for a certain period of time for the user 140 according to an embodiment of the invention. The observation data in the table of FIG. 3 comprises counted observations of the user 140 per TA for different predetermined time periods, for example, 08:00-12:00, 12:00-16:00, and 16:00-08:00. The observations of the user 140 that are counted may be, for example, paging responses, tracking areas updates and/or other events performed by the user 140 or network node identifying the current TA of the user 140 to the network node collecting said observation data for the user 140 in the LTE wireless communication network 100.

In FIG. 3, it may be noted that the counted number of observations in the three rows (Hours) sum up to 89, 84 and 78 observations, respectively, over the range of TAs in which observations where made. It may also be noted that 80 observations out of the 89 observations between 08:00 and 12:00 occurred in TA 2 (TAI=2), which means that, between 08:00 and 12:00, 90% (80/89) of the observations of the user 140 where made from TA 2 (TAI=2). Similarly, between 12:00 and 16:00, 90% (76/84) of the observations of the user 140 where made from TA 2 (TAI=2), and between 16:00 and 08:00, 82% (64/78) of the observations of the user 140 where made from TA 23 (TAI=23). In this manner, for each TA in the table and for which an observation has been counted, a TA probability value, $p_{TA}$, for the user 140 may be determined, that is, a probability value based on the number of observations in the TA and the number of observations in all TAs in the table. The TA probability value, $p_{TA}$, may be determined for one, several or all of the different predetermined time periods.

FIG. 4 illustrates tables of exemplary paging sequence schemes for the user 140 in FIG. 2, for which the exemplary observation data in the table of FIG. 3 has been collected, according to an embodiment of the invention. Using the determined TA probability values, $p_{TA}$, one or more primary TAs (denoted by "P" in the tables in FIG. 4) may be determined. The primary TA(s) represent the TA(s) in which the user 140 is to be paged in first, i.e. the one or more primary TAs that are scheduled first in the paging sequence. The primary TA(s) may thus comprise the TA(s) in which a page response of a page to the user 140 is most likely to be received according to the determined TA probability values, $p_{TA}$.

Further, using the determined TA probability values, $p_{TA}$, the remaining TA(s) may be determined to be comprise in one or more secondary TAs (denoted by "S" in the tables in FIG. 4), wherein the one or more secondary TAs represent the TA(s) in which the user 140 is to be paged in if no page response has been received for the page of the user 140 in the one or more primary TAs. That is, the one or more secondary TAs are scheduled second in the paging sequence. Based on the determined TA probability values, $p_{TA}$, the remaining TA(s) may also be divided into later groups of TAs in which the user 140 is to be paged in if no page response has been received for the page of the user 140 in the one or more primary TAs or in the one or more secondary TAs scheduled before the later group of TAs in the paging sequence. It should be noted that any number of groups of TAs subsequently following the primary group of TA(s) may be determined based on the determined TA probability values, $p_{TA}$.

In the exemplary paging sequence scheme shown in the upper table in FIG. 4, only TA 2 (TAI=2) is comprised in the primary TA(s) for the predetermined time periods 08:00-12:00 and 12:00-16:00. The remaining TAs are determined as secondary TAs for these predetermined time periods. In a similar manner, only TA 23 (TAI=23) is comprised in the primary TA(s) for the predetermined time period 16:00-08:00. Thus, this exemplary paging sequence scheme determines that a primary page is sent to the TA in which a page response of a page to the user 140 is most likely to be received. In the exemplary paging sequence scheme shown in the lower table in FIG. 4, the TA 2 (TAI=2) and TA 23 (TAI=23) are comprised in the primary TAs for the predetermined time periods 08:00-12:00 and 12:00-16:00. The remaining TAs are determined as secondary TAs for these predetermined time periods. In a similar manner, TA 23 (TAI=23) and TA 2 (TAI=2) are comprised in the primary TAs for the predetermined time period 16:00-08:00. Thus, this exemplary paging sequence scheme determines that a primary page is sent to the two TAs in which a page response of a page to the user 140 is most likely to be received.

Both of these exemplary paging sequence schemes will result in fewer page messages being sent, even though some page responses may still occur in the second round of paging, i.e. paging in the secondary TAs in case no page response was received for any of the primary TAs. For the exemplary paging sequence scheme shown in the upper table in FIG. 4 based on the exemplary observation data in the table of FIG. 3, an average page may mean 1.49 messages per page and responses after 1.12 rounds as shown by the exemplary calculations below.

Consider one scheme (time period) and let the number of paging rounds be denoted by R and let $C_1$ be the set(s) of cells (e.g. one or more cells or TAs) included in the primary round, $C_2$ the set(s) of cells included in the second round and so on, and let $|C_r|$ denote the cardinality or number of members (that is, the number of cells in the set(s) of cells) of the set $C_r$. Also let $p_r$ denote the probability of response from any cell in $C_r$. The average number of pages in the scheme will then amount to Eq. 1.

$$\Sigma_{r=1}^{R}(\Sigma_{\rho=1}^{r}|C_\rho|)p_r \quad\quad\quad (Eq.\ 1)$$

The inner sum is the number of cells to be paged in conditioned on that the user is located in a cell assigned to round r and the outer sum removes the conditioning. The average number of pages over all schemes may then be obtained by weighting the different schemes by the number of pages in the corresponding periods. Referring to FIGS. 3-4 (and assuming one cell per TA) we thus get 89/(89+84+78) (80/89×1+9/89×5)+84/(89+84+78) (76/84×1+8/84×5)+78/(89+84+78) (64/78×1+14/78×5)=1.49 messages per page.

Using the same notation as in the previous example, the average response time for a scheme will amount to Eq. 2.

$$\Sigma_{r=1}^{R}rP_r \quad\quad\quad (Eq.\ 2)$$

Similar to above, r is the response time conditioned on that the user is located in a cell assigned to round r and the sum removes the conditioning. The average response time over all schemes may then be obtained by weighting the different schemes by the number of pages in the corresponding periods. Referring to FIGS. 3-4, we thus get 89/(89+84+78) (80/89×1+9/89×2)+84/(89+84+78) (76184×1+8/84×2)+78/(89+84+78) (64R8×1+14/78×2)=1.12 rounds. In a similar manner, for the exemplary paging sequence scheme shown in the lower table in FIG. 4, an average page means 2.13 messages per page and responses after 1.08 rounds. Thus, these exemplary paging sequence schemes may eliminate as much as 70% and 55% of the paging messages, respectively, and only increases the number of paging rounds by 12% and 8%, respectively.

According to a further more detailed example, assume that probability p(u, p, t) is the probability that a UE u during one of the predetermined time periods p will respond to a page in a TA t may be estimated as the number of page responses in the TA t relative to the number of page responses in any TA in the TAI list for the UE u. This enables the probability p(u, p, t) to be expressed according to Eq. 3 below.

$$p(u,\ p,\ t) \approx \frac{e(u,\ p,\ t)}{\sum_{\tau=1}^{T_u(s)} e(u,\ p,\ \tau)} \quad\quad\quad (Eq.\ 3)$$

Further, assume that the TAs 1, . . . , $T_u(p)$ be ordered such that, for any t:t=1, . . . , $T_u(p)-1$, we have that $p(u, p, t) \geq p(u, p, t+1)$. Also, note that the ordering thus depends on both UE u and the predetermined time period s.

Furthermore, let P(u, p, t) denote the sum of the probabilities in the t most likely TAs. Thus, this sum may be expressed according to Eq. 4 below.

$$P(u, p, t) = \sum_{\tau=1}^{t} p(u, p, \tau) \qquad \text{(Eq. 4)}$$

These equations may then be used to define a selective paging sequence scheme which reduces the expected number of paging attempts subject to specific probabilities of delay. Assume, e.g., that 90% of all pages should result in a response in the first round, a further 9% of all pages should result in a response in (at least) the second round, and that all pages should result in a response in (at least) the third round. One example of a selective paging sequence scheme or algorithm that reduces the number of pages may then be defined by the following steps:

In the first round of the paging sequence, page the UE u in the first t' TAs, where t' is the smallest t for which $P(u, p, t) \geq 0.9$;

In case no page response is received during the first round, page in a second round the UE u in all or the next t" TAs, where t" is the smallest t for which $P(u, p, t) \geq 0.99$;

In case no page response is received during the second round, page in a third round the UE u in all or the remaining TAs on the TAI list;

In case no page response is received during the third round, repeat the page the UE u in all TAs on the TAI list of the UE u. Alternatively, the above described sequence may be repeated again from the top;

In case no page response has been received, possibly after a predetermined number of repetitions, reject the paging request.

As noted above, in case no page response is received from the UE 140 in the above selective paging sequence scheme or algorithm, the selective paging sequence scheme or algorithm may be repeated a predetermined number of times before the paging request is rejected. Alternatively, a page may be sent out in all TAs in which an observation or page response has been made of the UE 140, a page may be sent out in all TAs, or a page may be sent out in all TAs having a TAI comprised in the TAI list assigned to the UE 140, before rejecting a paging request.

In the general case it is possible to log, for each UE 140, the time and cell, set of cells and/or TAs for all UE 140 activities. This approach may, however, create very large amounts of data to be collected and stored.

In some embodiments, it may therefore be preferable to use a finite and discrete time scale. That is one or more time cycles may be identified, such as, for example, a day, workdays, weekends, or a week, and then partition this period(s) into a number of predetermined time periods (which also may be referred to as sub-periods), such as, for example, hours. This may transforms time into a closed set of integers, e.g. 0-23. As noted in the previous example, different sub-periods may be of different lengths in time. In some embodiments, it may also be preferable to reduce the number of locations and events. This may, for example, be done by limiting the scope to TAs on the TAI list of the UE 140 and/or excluding UE events of less interest, such as, for example, TAUs, etc. The latter may also comprise pooling the remaining events, such as, for example, page responses, etc., into single counters. Thus, according to an exemplary embodiment using the above mentioned simplifications, it may be noted that paging data may be collected in U number of counter matrices having a dimension of $P_u \times T_u$. U is here the number of handled UEs, $P_u$ is the number of predetermined time periods (i.e. sub-periods) in a cycle for UE u, and $T_u$ is the number of TAs in the TAI list of UE u. In other words, element [p,t] of the counter matrix u is the number of times UE u has responded to pages from TA t during sub-period p (as illustrated in the example shown in FIG. 3). Note that $T_u$, the length of the TAI list, may depend on the sub-period p; hence $T_u = T_u(p)$. However, entries in these u numbers of counter matrices may not simply be incremented continuously, since this would eventually result in the counter matrices overflowing and containing old information which may have become irrelevant for determining any paging sequence scheme or algorithm for the UE that is currently up to date.

In some embodiments, this problem may be overcome by determining the number of observations per TA that is made of a UE 140 by using estimates of these values instead. According to one example, these estimates may be provided by applying exponential averaging techniques, such as, for example, exponential weighted moving average (EWMA). One example of using EWMA for this purpose is shown in Eq. 5.

$$e_{k+1} = (1-\alpha)e_k + \alpha o_{k+1} \qquad \text{(Eq. 5)}$$

Here, a $k+1^{st}$ estimate $e_{k+1}$ is calculated as a weighted sum of the $k^{th}$ estimate $e_k$ and the $k+1^{st}$ observation $o_{k+1}$. $\alpha$ is used as a weight parameter, wherein $\alpha: 0 \leq \alpha \leq 1$.

In some embodiments, the use of estimates as described above may be extended by enabling the weight parameter $\alpha$ to be automatically self-tuning. This may, for example, be performed by maintaining a set of different estimates based on different weight parameters. For example, a set of estimates of the number of observations per cell and/or TA of a UE 140 using EWMA may be calculated. The set of estimates may comprise one estimate using a first weight parameter, at least one estimate using a second weight parameter that is lower than the first weight, and at least one estimate using a third weight parameter that is higher than the first weight. In a first step, the number of observations per cell and/or TA that is made of a UE 140 may be based on an estimate using the first weight parameter. The estimates yielded by the first, second and at least third weight parameter may then be compared with the actual number of responses per cell and/or TA that is made of the UE 140. Based on the comparison, either of the first, second or at least third weight parameter may be set as the first weight when calculating a new set of estimates, that is, whichever weight parameter that yielded the most accurate estimate. This is further illustrated in the following example.

For a given weight parameter $\alpha$, further estimates may be calculated using other weight parameters, such as, for example, a lower weight parameter $\alpha/2$ and higher weight parameter $2\alpha$. Thus, the estimates corresponding to the given weight parameter $\alpha$ may be used to form selective paging sequence schemes or algorithms, while the estimates corresponding to the other two weight parameters $\alpha/2$ and $2\alpha$ may be used in a tuning comparison. In the tuning comparison, the different estimates based on the different weight parameters $\alpha/2$, $\alpha$ and $2\alpha$ may be compared with the subsequent resulting number of responses obtained for the UE 140. If the result of such a tuning comparison indicates that, for example, a selective paging sequence scheme or algorithm based on estimates using the higher weight parameter $2\alpha$ is deemed to give a better result than a selective paging sequence scheme or algorithm based on the estimates using the weight parameter $\alpha$, the weight parameter α used to form the selective paging sequence schemes or algorithms may be shifted such that the weight parameter α retains a new parameter value that is equal to the parameter value of the weight parameter 2α. It follows that the old parameter value of αbecomes the new lower weight parameter, and a new higher weight parameter may be calculated and used in the next tuning comparison.

It should be noted that it may be preferable to allow predetermined number of new observations of UE 140 between two tuning comparisons in order to ensure that all estimates are relevant. According to one example, in order to get an idea of the number of observations required, assume that α=1/16, that the initial "estimate" is zero (i.e. $e_0$=0) and that one observation per day is obtained for the UE 140. In this case, it will take about log(1−p)/log(1−α) or approximately 36 days to scale down the influence of the initial estimate by 90%. Hence, it may be preferable to wait in the order of 1 month before evaluating the weight parameters in a tuning comparison when implementing the automatic self-tuning described above.

In some embodiments, it is may also be advantageous to perform an "active" collection of observation data for the UE 140 by initiating signalling transmissions, such as, for example. GUTI relocation signalling, etc. This type of signalling or transactions, which may change the temporary identity of the UE 140, need not be noted by the user of the UE 140 (although an extreme usage may lead to an increased battery drainage) nor affect the wireless communication network 100 to any significant extent (e.g. if the signalling is preformed as background data traffic with low priority). According to one example, the collection of observation data for the UE 140 may be initiated, for example, by timers, such that a UE 140 that has not been observed for a longer period of time will be paged. In contrast to regular, periodic TAUs, these pages may be initiated by the wireless communication network 100 and handled with low priority so as to not interfere with other data traffic. Thus, by initiating signalling transmissions with the UE 140 based on the expiry of a predetermined time period since the last observation of the UE 140, observations of the UE 140 may be received. These observations of the UE 140 may then be used in determining the number of observations per TA that is made of the UE 140.

In some embodiments, the partitioning of time into predetermined time periods or sub-periods as previously described above, may preferably be made such that the total paging effort and the number of sub-periods are minimised. Thus, when determining the number of observations per TA that is made of a UE 140, two sub-periods may be merged, for example, based on a calculated correlation coefficient between the two sub-periods over all TAs. However, it should also be noted that one sub-period may also be split, for example, based on a calculated dispersion coefficient of the sub-period over all TAs. A minimised total paging effort entails as few pages as possible in as few TAs as possible, and results in a conservation of bandwidth in the wireless communication network 100. A minimised number of sub-periods may comprise reducing the number of sub-periods, so as to achieve statistically robust estimates. A minimised number of sub-periods will also result in the conservation of memory storage capacity.

According to one example, a correlation coefficient, $\rho_u(p, p+1)$, between two sub-periods p and p+1 over all TAs may be calculated according to Eq. 6.

$$\rho_u(p, p+1) = \frac{E\{p(u, p, t)p(u, p+1, t)\} - E\{p(u, p, t)\}E\{p(u, p+1, t)\}}{\sqrt{V\{p(u, p, t)\}V\{p(u, p+1, t)\}}} \quad \text{(Eq. 6)}$$

Here, the expectation values E{ } and the variances V{ } are calculated over all TAs T. Thus, resulting values of the correlation coefficient, $\rho_u(p, p+1)$, that are close to unit (i.e. 1) indicate that the sub-periods p and p+1 are similar and may be merged. Correspondingly, sub-periods p having insignificant differences between TAs may be split in order to improve precision. According to one example, a dispersion coefficient, $C_u(p)$, of a sub-period p over all TAs may be calculated according to Eq. 7.

$$C_u(p) = \frac{V\{p(u, p, t)\}}{E\{p(u, p, t)\}} \quad \text{(Eq. 7)}$$

Here, the expectation value E{ } and the variance V{ } are also calculated over all TAs T. Thus, resulting values of the dispersion coefficient, $C_u(p)$, that are close to zero (i.e. 0) indicate that sub-period p is dispersed and may be split. It should also be noted that the total number of observations per cell and/or TA that is made of a UE 140 in the sub-period p may advantageously be large enough to motivate the split and to suffice for reliable estimates in both subsequent split sub-periods.

In a similar manner as previously described above, a certain number of new observations between two sub-period partitionings may advantageously be allowed in order to ensure that all estimates are relevant. It may also be advantageous to prevent too frequent sub-period re-partitionings. This may be performed, for example, by freezing results for a certain time period and/or ensuring that the criteria for merging two sub-periods and splitting a time period have enough hysteresis.

The exemplary paging sequence scheme according to the embodiments described above, which are based on a relative long-term data collection on a per UE basis, may also be combined with a relative short-term data collection for all UEs as will be described in the following with reference to FIG. 5.

FIG. 5 illustrates a table of exemplary observation data collected for all UEs for one set of cells (here, e.g. TA) according to an embodiment of the invention. It should be noted that while the embodiments described above with reference to FIGS. 2-4 may be well suited for so called "blind pages", that is, pages performed when there is no recent information available about the whereabouts of a UE 140, the network node 101, 120, 121, 122, 130, 131 may in many cases, however, experience some indications about the whereabouts of the UE 140, such as, for example, through various data traffic activities, periodic TAUs, etc. In such cases, this information may be used to achieve a combined selective paging sequence scheme or algorithm wherein, for example, the first round of paging in the primary set(s) of cells (e.g. TA(s)) are also ensured to be made in the most recently known cell(s) or TA(s) and/or its (their) neighbouring cells or TAs.

In some embodiments, this may be performed by determining if the TA of the last observation of the UE 140 and/or thereto neighbouring TA(s) are to be comprised in the primary, secondary or later TA(s) based on a probability value, $p_D$. The probability value, $p_D$, may indicate the probability that a UE 140 will be found in a TA, or in a neighbouring TA(s). The probability value, $p_D$, may be determined for a particular TA based on the common general behaviour of all or a large number of UEs located in that particular TA.

According to some embodiments, this may be performed by, for a predetermined number of time periods, determining the number of UEs which are observed for each time period in the particular TA. This may be performed by monitoring the time periods between successive observations of all or a large number of UEs in that particular TA and/or in TAs that are neighbours to the particular TA. Then, prior to enabling the paging of the UE, the probability value, $p_D$, for the UE indicating the probability that the UE can be found in a TA may be calculated based on the time and TA of the last observation of the UE, and the determined number of UEs achieving each time period in the TAs. The probability value, $p_D$, may then be compared with the probability value, $p_{TA}$, for the primary TA(s) in which the UE is to be paged in first according to the paging sequence. Based on said comparison, it may be determined if the TA of the last observation of the UE and/or neighbouring TAs are to be comprised in the primary TAs in which the UE is to be paged in first according to the paging sequence.

It should be noted that the relative short-term data collection for all users described above may besides being performed per TA, also be performed per IMSI, per IMEI, per UE type, per time of day, per day of week, per subscription type and/or per page request type (e.g. voice and data may be treated differently), etc.

According to an illustrative example, the network node 101, 120, 121, 122, 130, 131 may keep track of UE dwelling times by logging times between two successive observations in the same TA and times between successive observations in different TAs. With discrete dwelling times (D values, i.e. "Time period" in FIG. 5) and discrete outcomes for the same TA (O=2 (yes/no) values i.e. "Counter" in FIG. 5), the network node 101, 120, 121, 122, 130, 131 may maintain and use counter matrices of the dimensions D×O as shown in FIG. 5.

FIG. 5 shows a simple example with one matrix per set of cells (here, e.g. TA) and D=5 dwelling times. It shows, for example, that on 37,880 occasions, the time between two observations of UEs, the first of which was in the TA, was between two and five minutes, and that the TA was the same on 36,033 of these occasions. Thus, a probability value, $p_D$, indicating the probability that a UE 140 will be within the TA after five minutes may, for example, be estimated as $p_D \approx 36,033/37,880 = 0.951$. As shown in this example, this allows the probability that a user seen in an area a at time t will be in the same area a also at time t+Δt to be estimated.

In FIG. 6, the network node 101, 120, 121, 122, 130, 131 may maintain and use counter matrices with discrete elapsed time periods (i.e. "Time period" in FIG. 5) and discrete outcomes for the same TA and/or one or more different neighbouring TAs (i.e. "Counter" in FIG. 5). Also, in this example, with one matrix per TA and D=5 dwelling times, a probability value, $p_D$, indicating the probability that a UE 140 will be within the TA after five minutes may, for example, be estimated as $p_D \approx 36,033/37,880 = 0.951$. However, as can be seen, further probability values may be estimated indicating the probability that a UE 140 will be in a neighboring TA (N1 or N2) five minutes later, such as, for example, $p_{DN1} \approx 250/37,880 = 0.0066$ and $p_{DN2} \approx 387/37,880 = 0.0102$. As shown in this example, besides allowing the probability that a user seen in an area a at time t will be in the same area a also at time t+Δt to be estimated, it also allows the estimation of the probability that a user seen in area a at time r will be in a different area a', a':a'≠a, at time t+Δt.

It should be noted that the counters in these matrices may be determined and used in a similar manner as described above, and possible weight parameters and the number of time period intervals may be adjusted accordingly.

Thus, when the network node 101, 120, 121, 122, 130, 131 is about to page a UE it can check the time and TA of the last observation of the UE, calculate the elapsed time and estimate the probability that the user can be found in that TA as $p_D$ above. The network node 101, 120, 121, 122, 130, 131 can then compare this probability $p_D$ to the calculated probability value $p_{TA}$ (i.e. p(u, p, t)) for the TAs in the primary, secondary and/or later group of TAs in which the UE is to be paged in first, secondly or later according to the paging sequence. Based on said comparison, the network node 101, 120, 121, 122, 130, 131 may determine if the TA of the last observation of the UE and/or neighbouring TAs are to be comprised in the primary, secondary and/or further group of TAs in which the UE is to be paged in first, secondly or later according to the paging sequence.

According to some embodiments, it may not be necessary to reduce paging attempts outside the busy hour(s) hence one may limit data collection to these periods. Moreover, according to some embodiments, it is not necessary to tie the observation and/or response statistics to particular TAI lists but one can perform a general collection of observations and/or responses per TAI and user or cluster of users (possibly during the busy hour only). In these embodiments, such statistics could be used in the same way as above with the addition that the TAIs which are in the TAI list but for which no statistics exist may be handled by a further default procedure. One example of such a default procedure is "page in first round" (if, e.g., it may be assumed that the TAI that appears in the TAI list was assigned when the user was there). Thus, in some embodiments, when determining the paging sequence of TAs for the UE it may be beneficial, in case no observation has been made of the UE for a TA with a TAI comprised in a TAI list assigned to the UE, to also include this TA in either of the primary, secondary or later group of TAs.

It should be noted that in the above description, it is assumed that all embodiments are implemented in a network node 101, 120, 121, 122, 130, 131, such as, for example, in the MME 130, 131. In some embodiments, the MME 130, 131 may also be arranged to communicate directly with other MMEs in order to pass on the above mentioned information to the other MMEs, for example, by using a proprietary solution or a standardised one based on, for example, MME context IEs. Another alternative may be not to pass information between pooled MMEs, that is, to let pool members learn for themselves. According to a further alternative, the main part of the embodiments may be comprised in a management system or in some other network node, such as, for example, the Home Subscriber Server (HSS) 101, and let this system or network node download location data from the MMEs 130, 131 and subsequently upload paging scheme data to the MMEs 130, 131. In some embodiments, it may also be advantageous to closely integrate the embodiments with the algorithm(s) used to create the TAI lists.

Hence, it should be understood that embodiments using the repetitive movement patterns (as shown and described in reference to FIGS. 2-4) as well as dwelling times for the UEs (as shown and described in reference to FIGS. 5-6) in order to reduce the number of pages in large mobility areas, such as, LAIs, RAIs and TAIs, and/or in long TAI-lists will allow for a parallel minimisation of both position updates and user paging. Furthermore, the computation complexity required for the embodiments is low, and requiring only a few parameters, which all may be made self-tuning.

Figure 7:
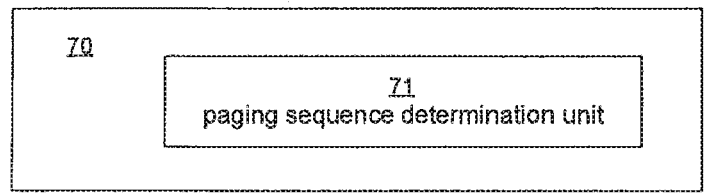
FIG. 7 illustrates an apparatus according to an embodiment of the invention.
Figure 8:
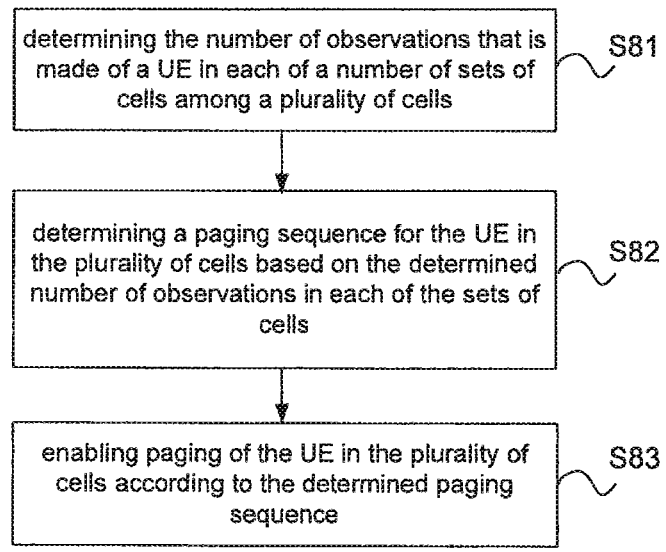
FIG. 8 is a flow chart of a method according to an embodiment of the invention.

FIG. 7 illustrates an apparatus 70 for determining the paging sequence schemes according to the embodiments described above, which may be implemented in a network node 101, 120, 121, 122, 130, 131. The paging sequence determination unit 71 may be implemented in one or more processing units (not shown) which may comprise logic for performing the functionality of the apparatus 70. A part, parts or all of the apparatus's 70 functionality may be implemented by means of a software or computer program. The processing unit(s) may also comprise storage means or a memory unit for storing the computer program and processing means, such as, for example, a microprocessor, for executing the computer program. The storage means may also be readable storage medium separated from, but connected to the processing unit. When, it is described that a certain action or function is performed above, it is to be understood that processing unit(s) of the paging sequence determination unit 71 in the apparatus 70 may use its processing means to execute a certain part of the software or computer program which is stored in its storage means to perform this action or function FIG. 8 is a flow chart of a method in a network node 101, 120, 121, 122, 130, 131 in a wireless communication network 100 for use in paging a UE 140 in a plurality of cells according to an embodiment of the invention. In step S81, the paging sequence determination unit 71 may determine for the plurality of cells the number of observations that is made of the UE 140 in each of a number of sets of cells (e.g. TAs) among the plurality of cells. In step S82, the paging sequence determination unit 71 may determine a paging sequence for the UE in the plurality of cells based on said determined number of observations in each of the sets of cells. In step S83, the paging sequence determination unit 71 may enable paging of the UE 140 in the plurality of cells according to the determined paging sequence. A simplified, but more detailed flow chart of what the network node 101, 120, 121, 122, 130, 131 may do when a particular user u is observed is depicted in FIGS. 9-12. The flowcharts depicted are similar to those used in accordance with Specification and Description Language (SDL).

Figure 9:
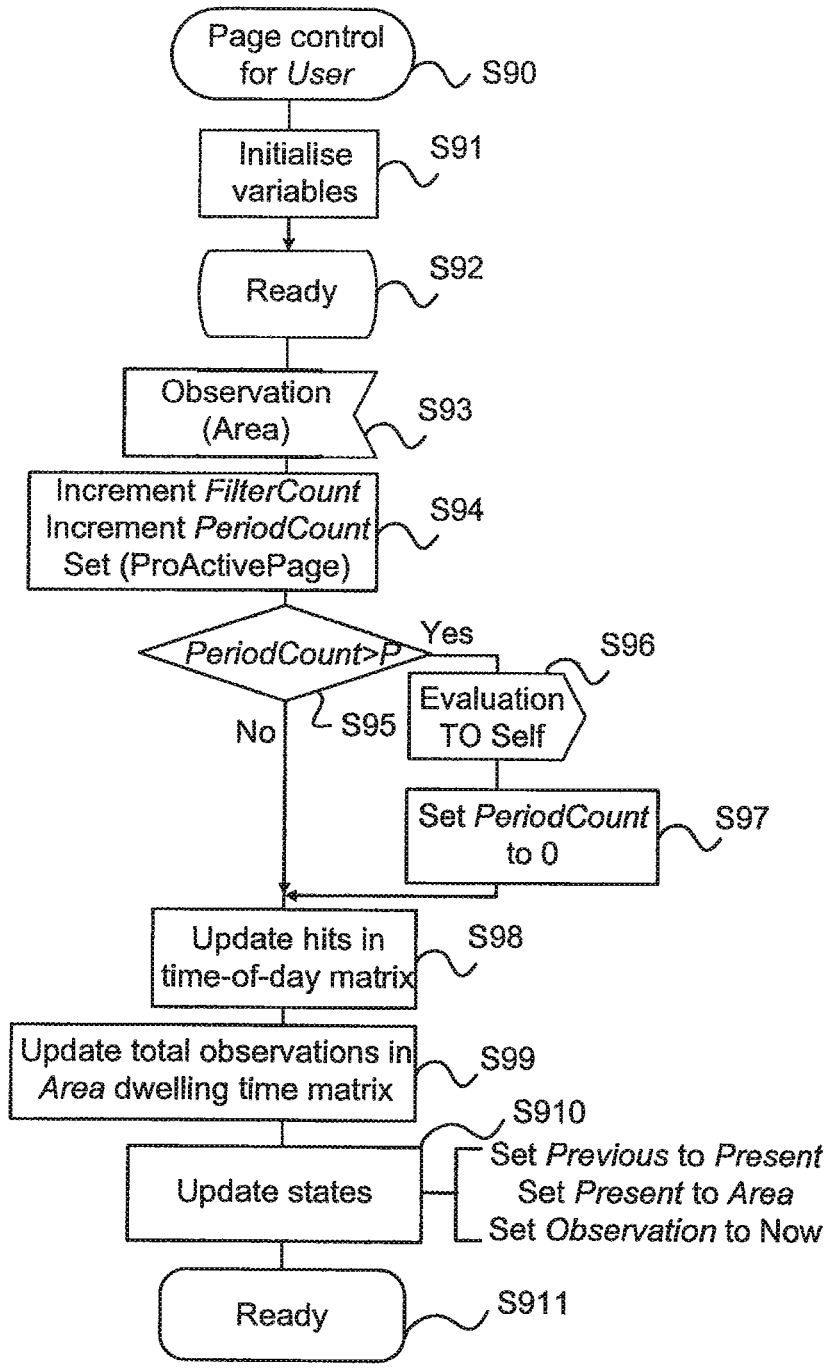
FIG. 9 is a flow chart of a method according to an embodiment of the invention.

FIG. 9 is a flow chart of a method according to an embodiment of the invention. This flowchart illustrates the initialisation and the events and actions performed when the user u is observed.

In step S90, the procedure controlling statistics of User is started.

In step S91, the procedure initialises its data by, e.g., setting counters to zero, initial values for α, set the timeout until a proactive page should be performed etc.

In step S92, the procedure is ready to receive new information (this is a state which will be shown in many places but all of them represent the same state).

In step S93, the procedure is informed that User has been seen in a set of cells Area.

In step S94, the procedure, first increments, second, increments the number of data points recorded with the current settings and, third, resets the timeout until a proactive page should be performed.

In step S95, the procedure tests if a predetermined number of observations has been made with the current period settings.

In step S96, the procedure informs itself that it must evaluate its period settings as soon as it can (this information may be acted upon as soon as the procedure enters the Ready state).

In step S97, the procedure resets the number of data points recorded with the current period settings.

In step S98, the procedure updates the hits in the time-of-day matrix as in FIG. 5.

In step S99, the procedure updates the hits in the recurrent observation matrix as in FIG. 6.

In step S910, the procedure updates its location information about the user by noting that the new area is present, the previous present is past and that the observation was made now.

In step S911, the procedure is ready to receive new information (this is a state which is the same as the state in step S92 and all other occurrences).

Figure 10:
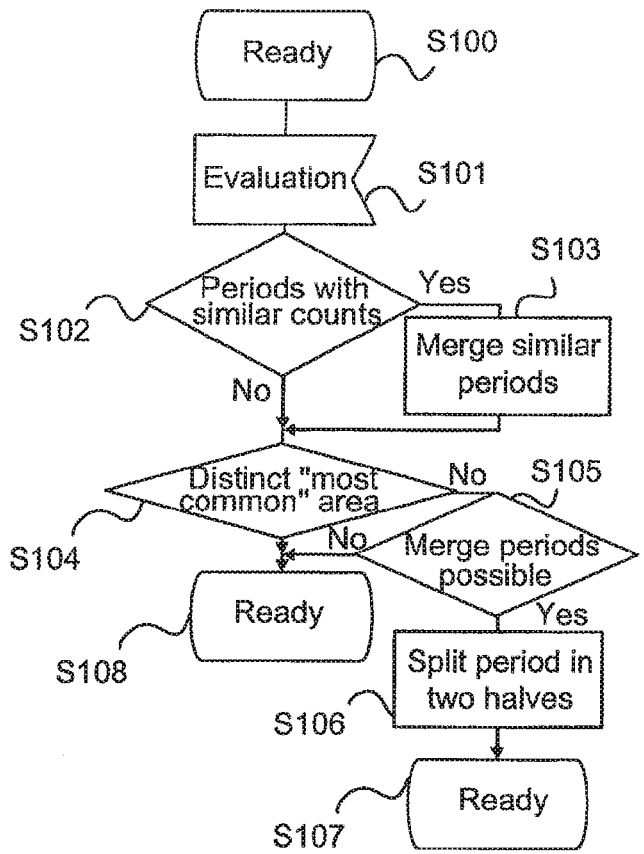
FIG. 10 is a flow chart of a method according to an embodiment of the invention.

FIG. 10 is a flow chart of a method according to an embodiment of the invention. This flowchart illustrates the events and actions performed when the sub-periods are modified.

In step S100, the procedure is ready to receive new information (this is a state which is the same as the state in step S92 and all other occurrences).

In step S101, the procedure receives information that it must perform an evaluation (this information may be the result of a previous execution of Step S96 or, e.g. of a manual command by an operator).

In step S102, the procedure examines period counts with respect to similarity, for example, Eq. 4.

In step S103, the procedure merges two periods with high correlation.

In step S104, the procedure examines the counts with respect to distinct areas, for example. Eq. 5.

In step S105, the procedure examines the number of periods and the counts are examined to see if a split is possible. For example, the number of periods must fit in with the memory limitations and the counts must be high enough to obtain sufficiently many observations in each interval.

In step S106, the procedure splits the period into to halves.

In step S107, the procedure is ready to receive new information (this is a state which is the same as the state in step S92 and all other occurrences).

In step S108, the procedure is ready to receive new information (this is a state which is the same as the state in step S92 and all other occurrences).

Figure 11:
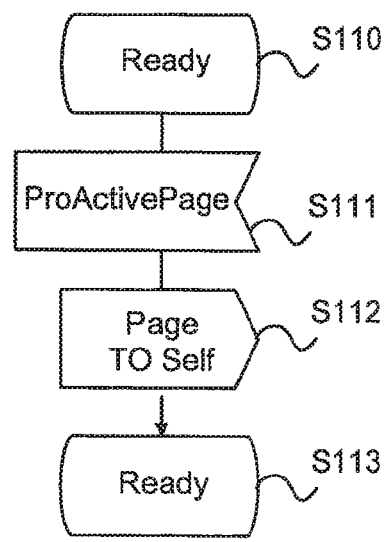
FIG. 11 is a flow chart of a method according to an embodiment of the invention.

FIG. 11 is a flow chart of a method according to an embodiment of the invention. This flowchart illustrates the events and actions performed when a timer for proactive paging expires. Note that the timer is reset upon every observation according to the flowchart in FIG. 9.

In step S110, the procedure is ready to receive new information (this is a state which is the same as the state in step S92 and all other occurrences).

In step S111, the procedure receives information that it must perform a pro-active page (this information may be the result of a timeout manipulated in, e.g. step S91 and step S94 or, e.g. a manual command by an operator).

In step S112, the procedure informs itself that it must page the user (this information will be acted upon as soon as the procedure enters the Ready state).

In step S113, the procedure is ready to receive new information (this is a state which is the same as the state in step S92 and all other occurrences).

Figure 12:
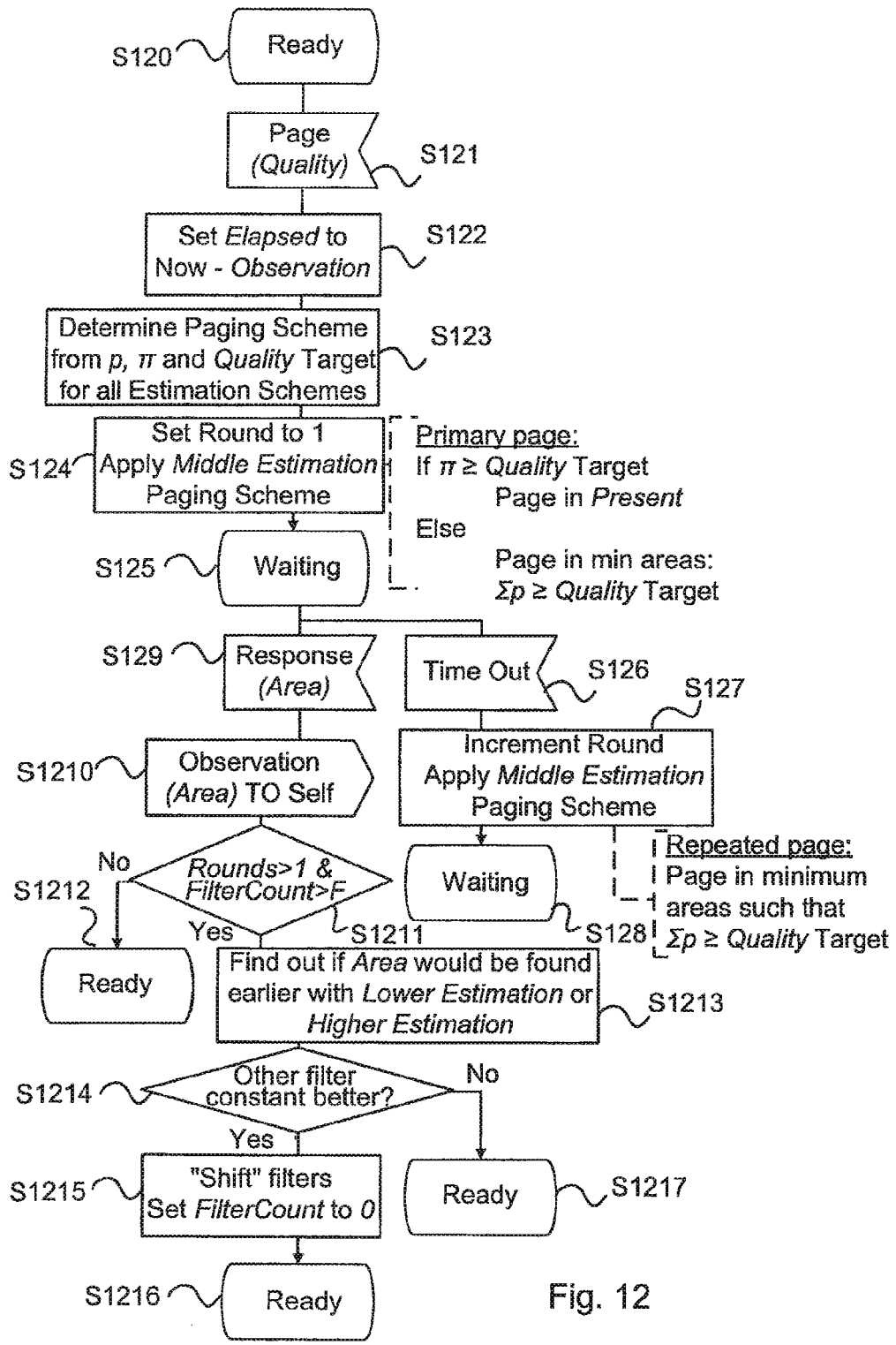
FIG. 12 is a flow chart of a method according to an embodiment of the invention.

FIG. 12 is a flow chart of a method according to an embodiment of the invention. This flowchart illustrates the events and actions performed when the user u is to be paged.

In step S120, the procedure is ready to receive new information (this is a state which is the same as the state in step S92 and all other occurrences).

In step S121, the procedure is informed that it must to page the user with a certain quality.

In step S122, the procedure calculates the time elapsed since the last observation.

In step S123, the procedure determines the paging scheme from p, π and quality. Here, p is the probabilities that the location of the user can be found from the regular behaviour, π is the probability that the user will be found from the recent position and quality refers to how important the page is (the more important the page, the more pages is made in the first round). A paging scheme is a division of all cells/TAs into paging rounds. Several such paging schemes are thus generated, one for each set of estimates (weights) respectively.

In step S124, the procedure runs the primary round and in this case a page is done in the most recent area if this is sufficient to reach the quality (probability of being found in the primary round) and otherwise pages are done in a number of regularly visited areas which is high enough to reach the quality (e.g. Eq. 2).

In step S125, the procedure is waiting for a response on its page information (this is a state which will be shown in one more places and all of them represent the same state).

In step S126, the procedure is informed that a time out has occurred while waiting for a response on the previous paging round.

In step S127, the next round is run and pages are done in a number of regularly visited areas which is high enough to reach the quality, e.g. Eq. 2 (probability of being found in the current round).

In step S128, the procedure is waiting for a response on its page information (this is a state which is the same state as in step S125.

In step S129, the procedure is informed that a response to a page has been received.

In step S1210, informs itself that it must update the location statistics for the user with the new location (this information will be acted upon as soon as the procedure enters the Ready state).

In step S1211, the procedure tests the need for a paging policy evaluation.

In step S1212, the procedure is ready to receive new information (this is a state which is the same as the state in step S92 and all other occurrences).

In step S1213, the procedure evaluates the results from other estimation sets (weights).

In step S1214, the procedure tests the results from other estimation sets (weights).

In step S1215, the procedure replaces the used estimation set by another estimation set.

In step S1216, the procedure is ready to receive new information (this is a state which is the same as the state in step S92 and all other occurrences).

In step S1217, the procedure is ready to receive new information (this is a state which is the same as the state in step S92 and all other occurrences).

It should be noted that in addition to the exemplary embodiments of the invention shown in the accompanying drawings, the invention may be embodied in different forms and should not be construed as limited to the embodiments set forth herein. Rather, these embodiments are provided so that this disclosure will be thorough and complete, and will fully convey the concept of the invention to those skilled in the art.

The invention claimed is:

1. A method in a network node in a wireless communication network for use in paging a user equipment (UE) in a plurality of cells, the method comprising:
   determining, for the plurality of cells, the number of observations made of the UE in each of a number of sets of cells among said plurality of cells;
   determining a paging sequence for the UE in the plurality of cells based on said determined number of observations in each of said sets of cells; and
   enabling paging of the UE in the plurality of cells according to the determined paging sequence; wherein:
   determining the number of observations made of the UE in each of the sets of cells and determining the paging sequence for the UE are performed for each of a predetermined number of time periods; and
   enabling the paging of the UE further comprises: selecting one of the determined paging sequences for the UE based on a current time period, and enabling the paging according to the selected determined paging sequence.

2. The method according to claim 1, wherein determining a paging sequence for the UE, further comprises:
   for each set of cells in which an observation has been made, calculating a probability value (pTA) for the UE based on at least the number of observations in the set of cells and the total number of observations in the plurality of cells; and
   determining one or more primary sets of cells in which the UE is to be paged in first in the paging sequence based on the calculated probability values (pTA).

3. The method according to claim 2, wherein determining a paging sequence for the UE, further comprises:
   determining one or more secondary sets of cells or later sets of cells in which the UE is to be paged in secondly or later on in the paging sequence if no page response is received earlier in the paging sequence based on the calculated probability values (pTA).

4. The method according to claim 1, wherein determining a paging sequence for the UE, further comprises:
   determining if a set of cells in which the last observation of the UE was made, and/or one or more neighbouring set(s) of cells, are to be comprised in one or more primary, secondary, or later sets of cells in which the UE is to be paged in according to the paging sequence based on a probability value (pD) indicating the probability that the UE may be found in the set of cells and/or one or more neighbouring set(s) of cells.

5. The method according to claim 4, further comprising:
   comparing the probability value (pD) with the probability value (pTA) for the one or more primary, secondary or later sets of cells in which the UE is to be paged in according to the paging sequence; and
   determining if the set of cells in which the last observation of the UE was made, and/or one or more neighbouring set(s) of cells, are to be comprised in the one or more primary, secondary or later sets of cells in which the UE is to be paged in according to the paging sequence based on said comparison.

6. The method according to claim 4, wherein the probability value (pD) is determined by:
   for the predetermined number of time periods, determining the number of UEs observed for each time period in the set of cells by monitoring elapsed time periods of successive observations of multiple UEs (UEs) in the same set of cells and/or one or more neighbouring set(s) of cells; and calculating the probability value (pD) for the UE indicating the probability that the UE may be found in a set of cells based on the time, the set of cells in which the last observation of the UE was made, and the determined number of UEs observed for each time period in the set of cells.

7. The method according to claim 4, wherein the steps that are performed for each set of cells are performed per IMSI, per IMEI, per equipment type, per time of day, per day of week and/or per UE subscription type.

8. The method according to claim 1, wherein determining the number of observations that is made of the UE in each of the sets of cells, further comprises:
   initiating signaling transmissions with the UE in order to receive and determine an observation of the UE based on the expiration of a predetermined time period since the last observation of the UE.

9. The method according to claim 8, wherein said signaling transmission is a low priority signaling transmission in the wireless communication network.

10. The method according to claim 1, wherein determining the number of observations that is made of the UE in each of the sets of cells, further comprises: merging two time periods of the predetermined number of time periods based on a calculated correlation coefficient between the two time periods over one or more sets of cells; or splitting a time period of the predetermined number of time periods based on a calculated dispersion coefficient of the time period over one or more sets of cells.

11. The method according to claim 1, wherein enabling the paging of the UE, further comprises:
   if no page response is received from the UE for the paging sequence, enabling a repeat of the paging according to the paging sequence one or more times, and/or enabling paging in all sets of cells in which a page response has been made by the UE, and/or enabling paging in all sets of cells among the plurality of cells, before rejecting a paging request.

12. The method according to claim 1, wherein each set of cells forms a tracking area (TA) that is associated with a tracking area identity (TAI) comprised in a tracking area identity (TAI) list assigned to the UE.

13. A method according to claim 12, wherein determining a paging sequence for the UE, further comprises:
   if no observation has been made of the UE for a tracking area (TA) with a tracking area identity (TAI) comprised in a tracking area identity (TAI) list assigned to the UE, including the tracking area (TA) in either of primary, secondary, or later set of cells in which the UE is to be paged in according to the paging sequence.

14. The method according to claim 1, wherein the predetermined number of time periods are separate time periods of a twenty-four hour time cycle and/or separate time periods of a week.

15. An apparatus for use in a network node in a wireless communication network for paging a user equipment (UE) in a plurality of cells, comprising:
   a paging sequence determination unit configured to determine, for the plurality of cells, the number of observations made of the UE in each of a number of sets of cells among said plurality of cells, determine a paging sequence for the UE in the plurality of cells based on said determined number of observations in each of said sets of cells, and enable paging of the UE in the plurality of cells according to the determined paging sequence;
   wherein:
   determining the number of observations made of the UE in each of the sets of cells and determining the paging sequence for the UE are performed for each of a predetermined number of time periods; and
   enabling the paging of the UE further comprises: selecting one of the determined paging sequences for the UE based on a current time period, and enabling the paging according to the selected determined paging sequence.

16. A network node comprising an apparatus according to claim 15.

17. A network node according to claim 16, wherein the network node is
   an eNodeB, MME or HS in a 3GPP Evolved Packet System network.

* * * * *

UNITED STATES PATENT AND TRADEMARK OFFICE
CERTIFICATE OF CORRECTION

PATENT NO. : 8,897,819 B2  
APPLICATION NO. : 13/474763  
DATED : November 25, 2014  
INVENTOR(S) : Arvidsson et al.

It is certified that error appears in the above-identified patent and that said Letters Patent is hereby corrected as shown below:

In the Specification

In Column 8, Line 36, delete "M. G.," and insert -- M. C., --, therefor.

In Column 13, Line 26, delete "example." and insert -- example, --, therefor.

In Column 16, Line 4, delete "time r" and insert -- time t --, therefor.

In Column 18, Line 40, delete "to" and insert -- two --, therefor.

In the Claims

In Column 22, Line 3, in Claim 13, delete "A" and insert -- The --, therefor.

In Column 22, Line 36, in Claim 17, delete "A" and insert -- The --, therefor.

Signed and Sealed this  
Twenty-ninth Day of September, 2015

Michelle K. Lee  
*Director of the United States Patent and Trademark Office*